(12) United States Patent
Li et al.

(10) Patent No.: US 8,750,602 B2
(45) Date of Patent: Jun. 10, 2014

(54) METHOD AND SYSTEM FOR PERSONALIZED ADVERTISEMENT PUSH BASED ON USER INTEREST LEARNING

(71) Applicant: Huawei Technologies Co., Ltd., Guangdong (CN)

(72) Inventors: Jia Li, Beijing (CN); Yunchao Gao, Beijing (CN); Haonan Yu, Beijing (CN); Jun Zhang, Beijing (CN); Yonghong Tian, Beijing (CN); Jun Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/709,795

(22) Filed: Dec. 10, 2012

(65) Prior Publication Data

US 2013/0094756 A1  Apr. 18, 2013

Related U.S. Application Data

(63) Continuation of application No. PCT/CN2010/079245, filed on Nov. 29, 2010.

(51) Int. Cl.
*G06K 9/62* (2006.01)

(52) U.S. Cl.
USPC .......................................... 382/155; 382/224

(58) Field of Classification Search
None
See application file for complete search history.

(56) References Cited

U.S. PATENT DOCUMENTS

| | | | | |
|---|---|---|---|---|
| 7,089,194 | B1 * | 8/2006 | Berstis et al. | 705/14.54 |
| 8,281,334 | B2 * | 10/2012 | Shan et al. | 725/34 |
| 8,417,568 | B2 * | 4/2013 | Nong et al. | 705/14.4 |
| 2003/0023598 | A1 * | 1/2003 | Janakiraman et al. | 707/10 |
| 2008/0147500 | A1 * | 6/2008 | Slaney et al. | 705/14 |
| 2009/0076909 | A1 | 3/2009 | Ioffe | |
| 2009/0177547 | A1 | 7/2009 | Piekarec et al. | |
| 2010/0312609 | A1 * | 12/2010 | Epshtein et al. | 705/10 |

FOREIGN PATENT DOCUMENTS

| | | |
|---|---|---|
| CN | 101483752 A | 7/2009 |
| CN | 101489139 A | 7/2009 |
| CN | 101621636 A | 1/2010 |
| CN | 101833552 A | 9/2010 |
| CN | 101834837 A | 9/2010 |
| WO | 2010085552 A1 | 7/2010 |

OTHER PUBLICATIONS

Lekakos, Georgios, and George Giaglis. "Delivering personalized advertisements in digital television: A methodology and empirical evaluation." Proceedings of the AH'2002 Workshop on Personalization in Future TV. 2002.*

(Continued)

*Primary Examiner* — Thomas Conway
(74) *Attorney, Agent, or Firm* — Leydig, Voit & Mayer, Ltd.

(57) ABSTRACT

Embodiments of the present invention relate to a method and a system for personalized advertisement push based on user interest learning. The method may include: obtaining multiple user interest models through multitask sorting learning; extracting an object of interest in a video according to the user interest models; and extracting multiple visual features of the object of interest, and according to the visual features, retrieving related advertising information in an advertisement database. Through the method and the system provided in embodiments of the present invention, a push advertisement may be closely relevant to the content of the video, thereby meeting personalized requirements of a user to a certain extent and achieving personalized advertisement push.

10 Claims, 6 Drawing Sheets

(56) References Cited

OTHER PUBLICATIONS

International Search Report in corresponding PCT Patent Application No. PCT/CN2010/079245 (Aug. 18, 2011).
Li et al., "Multi-Task Rank Learning for Visual Saliency Estimation," *IEEE Transactions on Circuits and Systems for Video Technology*, vol. 21, No. 5, IEEE (May 2011).
Lekakos et al., "A hybrid approach for improving predictive accuracy of collaborative filtering algorithms," Springer Science + Business Media B.V. (Jan. 25, 2007).
Shi et al., "A computational model of visual attention based on saliency maps," *Applied Mathematics and Computation*, No. 188, pp. 1671-1677, Elsevier, Inc. (2007).
Li et al., "A Dataset and Evaluation Methodology for Visual Saliency in Video," ICME, IEEE (2009).
Mei et al., "Contextual In-Image Advertising," *MM'08*, ACM, Vancouver, Canada (Oct. 2008).
Extended European Search Report in corresponding European Patent Application No. 10860233.5 (Oct. 29, 2013).

* cited by examiner (Three key frames are in a first row, which are corresponding to the push results of four advertisements in the following, respectively)

METHOD AND SYSTEM FOR PERSONALIZED ADVERTISEMENT PUSH BASED ON USER INTEREST LEARNING

CROSS-REFERENCE TO RELATED APPLICATIONS

This application is a continuation of International Patent Application No. PCT/CN2010/079245, filed on Nov. 29, 2010, which is hereby incorporated by reference in its entirety.

FIELD OF THE INVENTION

The present invention relates to the field of image processing, and in particular, to a method and a system for personalized advertisement push based on user interest learning.

BACKGROUND OF THE INVENTION

In recent years, the number of videos on the Internet increases rapidly, and the existence of a huge number of videos significantly promotes the development of services, such as online video advertising. At present, multiple methods for associating videos with advertisements based on different rules are used in video websites and video playing software. Generally speaking, these methods mainly emphasize the push of predefined advertisements, including:

1) Advertisements inserted in time domains: As shown in FIG. 1(a), a piece of predefined advertisement is played at buffering at the beginning, pausing in the middle, or at an end of a video. Forms of the advertisements may be a picture or a video, and so on.

2) Advertisements associated on a periphery: As shown in FIG. 1(b), when a video is played, a predefined advertisement is displayed on the periphery of a video player (such as a web page, and a boarder of the player).

3) Partially overlapped advertisements: As shown in FIG. 1(c), a small advertisement (a picture or a simple FLASH) is overlapped on a part of the content of a video, and usually does not affect a main part of the video.

At present, the foregoing three advertisement push methods are all applied widely. However, the effect of the advertisement push is not good. For example, in the first method, when the advertisement is played, a user is usually in a state of browsing other web pages, thereby reducing an advertising effect; although the second method has relatively small interference, the advertisement is often ignored as a background of a web page; the third method affects normal viewing experience of the user to a certain extent. The main issue is that the foregoing push advertisements usually have a relatively low association degree with the contents and cannot meet personalized interest requirements of each user. Therefore, the effect of the advertisements is relatively poor.

SUMMARY OF THE INVENTION

Embodiments of the present invention provide a method and a system for personalized advertisement push based on user interest learning, so as to solve an existing problem that push advertisements have a low association degree with contents and cannot meet personalized interest requirements of each user.

An embodiment of the present invention provides a personalized advertisement push method based on user interest learning, including:

obtaining multiple user interest models through multitask sorting learning;

extracting an object of interest in a video according to the user interest models; and extracting multiple visual features of the object of interest, and according to the visual features, retrieving related advertising information in an advertisement database.

An embodiment of the present invention further provides a personalized advertisement push system based on user interest learning, including:

an interest model learning module, configured to obtain multiple user interest models through multitask sorting learning;

an object of interest extraction module, configured to extract an object of interest in a video according to the user interest models; and an advertisement retrieval module, configured to extract multiple visual features of the object of interest, and according to the visual features, retrieve related advertising information in an advertisement database.

It can be known from the foregoing technical solutions that, in the embodiments of the present invention, the user interest models are obtained by utilizing an algorithm of multitask sorting learning, and based on this, areas with a relatively high interest degree in the video are automatically extracted for different users, and then advertising information association is performed by using the areas with a relatively high interest degree. The advertisement provided in such manner is not only closely related to the contents of the video, but also meets the personalized requirements of the user to a certain extent, thereby achieving personalized advertisement push.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can further derive other implementation manners according to these accompanying drawings without creative efforts.

DETAILED DESCRIPTION OF THE EMBODIMENTS

The specific embodiments of the present invention are further illustrated in detail in the following with reference to the accompanying drawings.

In an embodiment provided in the present invention, in a system according to a pre-collected scene set with various contents and interest feedback of a user to these scenes, a user interest model is obtained through training by adopting an algorithm of multitask sorting learning, and a scene classification and a user classification are obtained at the same time. Steps such as extraction of a bottom-layer visual feature of a scene, an initial random classification of scenes and users, and calculation of a parameter of an interest model are included. Then, the system detects a key frame when a video is played, classifies the scenes which correspond to the key frame according to a scene classification obtained in a model learning process, and calculates and generates an interest degree diagram according to the interest model of each user, respectively. At last, by utilizing an area growth method, an area with a relatively high interest degree is generated from the interest degree diagram and serves as an object of interest, and a related advertisement is retrieved in an advertising information database according to its multiple features, and at last a video stream with a personalized advertisement is output. Features of the object of interest reflect visual characteristics of the object at different angles and different levels, which include but are not limited to color, structure, outline, and texture feature. Preferentially, in the embodiments of the present invention, an HSV color histogram, a Gabor histogram, a SIFT histogram, and a video fingerprinting feature of the object of interest are extracted. Meanwhile, a retrieval method is a fast matching algorithm, and different matching methods are adopted for different features.

Figure 1:
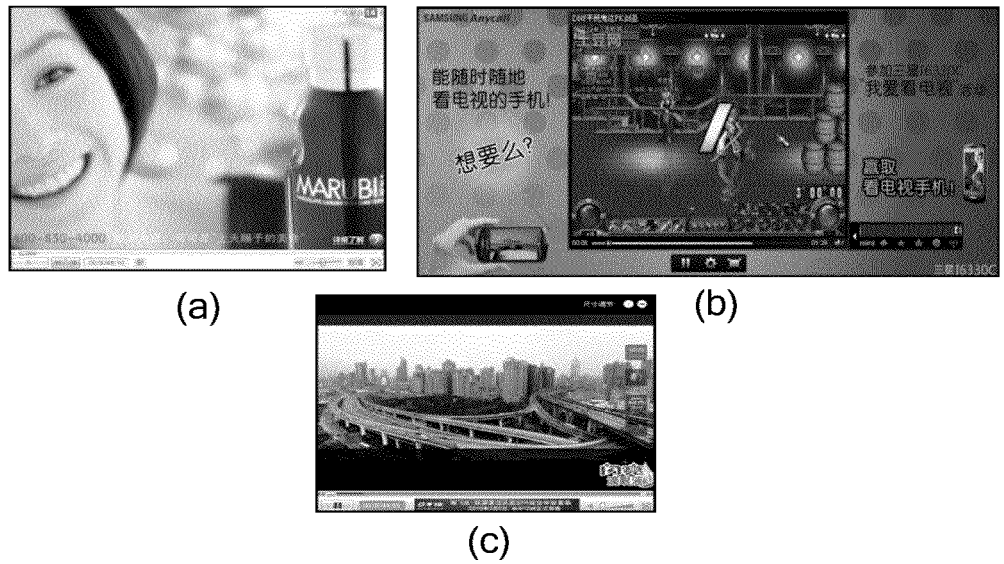
FIG. 1 is a schematic diagram of an existing advertisement push method.
Figure 2:
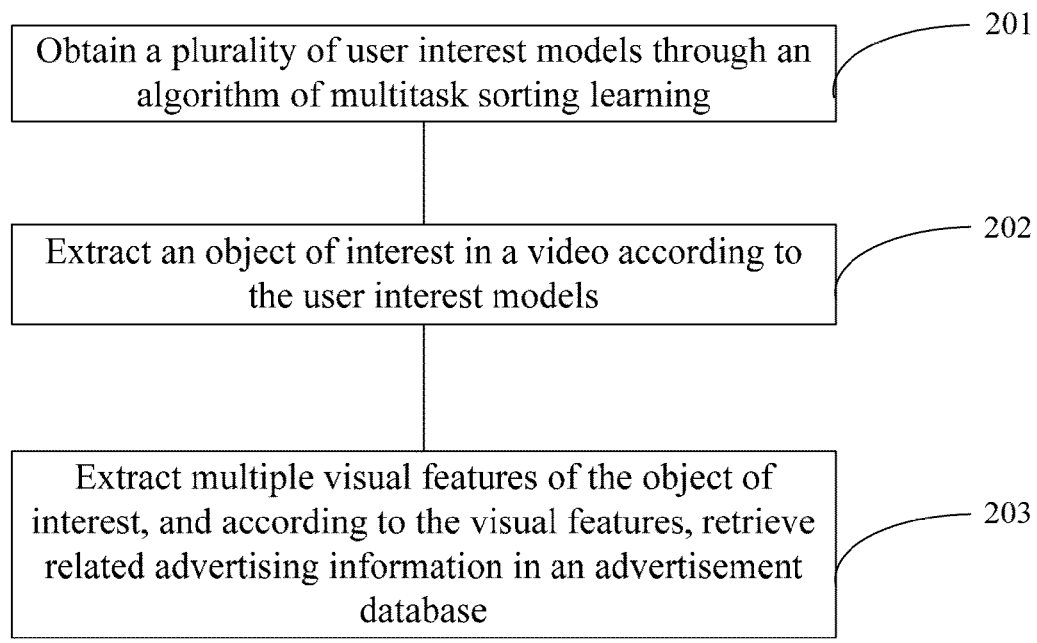
FIG. 2 is a schematic flow chart of a personalized advertisement push method based on user interest learning according to an embodiment of the present invention.

FIG. 2 is a schematic flow chart of a personalized advertisement push method based on user interest learning according to an embodiment of the present invention. As shown in FIG. 2, the embodiment may include the following steps:

Step 201: Interest model learning: obtain a plurality of user interest models through an algorithm of multitask sorting learning.

Figure 3:
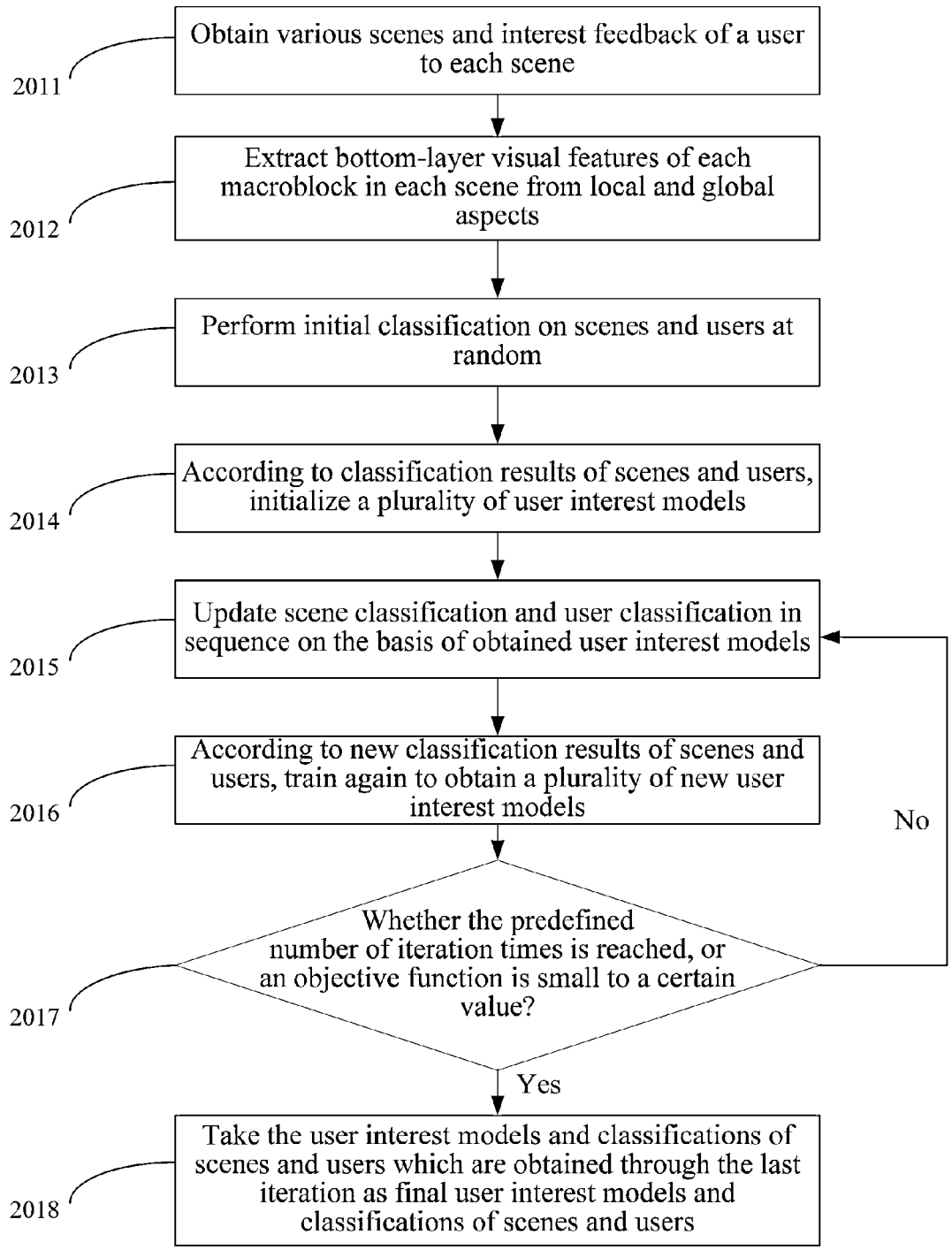
FIG. 3 is a schematic flow chart of user interest model learning according to an embodiment of the present invention.

As shown in FIG. 3, this step further includes:

Step 2011: Obtain various scenes and interest feedback of a user to each scene.

Specifically, the scene may include subjects of multiple aspects, such as advertising, news, cartoon, and movie. The user may mark an object of interest in these scenes through simple interaction. Since points of interest of different users are different even in a same scene, the following manner may be used to represent a scene set, a user set and a relationship between them:

$S = \{S_1, \ldots S_k, \ldots S_K\}$ represents a scene set including K scenes, where $S_k$ indicates a $k^{th}$ scene;

$\upsilon = \{U_1, \ldots U_m, \ldots U_M\}$ represents a user set including M users, where $U_m$ indicates an $m^{th}$ user;

The relationship between them is indicated by $\Theta = \{\theta_k^m \in \{0, 1\}\}$. When and only when the user $U_m$ interacts with the scene $S_k$ and marks the object of interest, $\theta_k^m = 1$. It is assumed that the scene $S_k$ is divided into a set of macroblocks $S_k = \{s_{k1}, s_{k2}, s_{kn}\}$, with the relationship between the object of interest $O_k^m$ marked by the user $U_m$ on the scene $S_k$ and the macroblocks in the scene $S_k$, another two-value set $\Upsilon_m^k = \{y_{ki}^m \in \{0, 1\}\}$ may be inferred, where when and only when an $i^{th}$ macroblock $s_{ki}$ in the scene $S_k$ is a part of the object of interest $O_k^m$ marked by the user, $y_{ki}^m = 1$.

Step 2012: Extract bottom-layer visual features of each macroblock in each scene from local and global aspects.

Specifically, each scene is divided into a set of macroblocks, and bottom-layer visual features of each macroblock are calculated. A bottom-layer visual feature of a whole scene may be obtained by combining the bottom-layer visual features of the macroblocks of this scene. In an embodiment, a scene may be divided into macroblocks in a size of 16 pels×16 pels, and a local contrast feature in a multi-scale and multi-vision channel may be extracted as the bottom-layer visual features of each macroblock. Meanwhile, by calculating a difference of multiple visual statistical characteristics between a macroblock and the whole scene where the macroblock is located, a global visual feature of the macroblock is obtained.

For the macroblock $S_{ki}$, it is assumed that $x_{ki}$ represents its feature vector, and then for a scene $S_k$, $\chi_k = \{x_{k1}, x_{k2}, \ldots x_{kn}\}$ represents a set of feature vectors of all its macroblocks. By utilizing the set $\chi_k$, a feature vector $v_k$ of the whole scene $S_k$ and a feature vector $\bar{v}_k^m$ of the object of interest are obtained through certain combination transformation. In an embodiment, $v_k$ is defined as an expected value and a standard deviation of the feature vector of each macroblock in the scene, and $\bar{v}_k^m$ is defined as an expected value and a standard deviation of the feature vector of each macroblock in the object of interest. Therefore, the task for training a user interest model changes to finding a model (or a function) $\phi: \chi \to \mathcal{R}$, and according to the feature vector $x_{ki}$ of different macroblocks $S_{ki}$ in the scene $S_k$, this model can assign different real values to the feature vector $x_{ki}$. And then, the real values are sorted. It is assumed that a sorting result is $\pi_k(\Phi) = \{\Phi(x_{k1}), \Phi(x_{k2}), \ldots \Phi(x_{kn})\}$ and then a final aim is to decrease a difference between the sorting result $\pi_k(\Phi)$ output by the model and a sorting result $\gamma_m^k$ fed back by the user.

Step 2013: Perform initial classification on scenes and users at random.

Specifically, the initial classification may be performed by randomly classifying the scenes and the users. Another visualized method is to perform initial classification on scenes and users according to similarity of the contents of the scenes and similarity of the user interest feedback, respectively. In this embodiment, the scene content similarity is calculated through the scene feature $v_k$ obtained in step 302, and the user interest similarity is calculated through the feature $\bar{v}_k^m$ of the object of interest chosen by each user. Results of the initial classification is indicated by $\alpha = \{\alpha_{ki} \in \{0, 1\}\}$ and $\beta = \{\beta_{mj} \in \{0, 1\}\}$, where when and only when $S_k$ is an $i^{th}$ kind of scenes, $\alpha_{ki} = 1$, and when and only when $U_m$ is a $j^{th}$ kind of users, $\beta_{mj} = 1$.

Step 2014: According to the classification results of the scenes and the users, initialize a plurality of user interest models.

Specifically, an objective function to be optimized needs to be constructed first before the user interest models are initialized. The objective function is divided into two parts, and in this embodiment, it is formalized as:

$$\min_{W, \alpha, \beta} \mathcal{L}(W, \alpha, \beta) + \lambda \Omega(W, \alpha, \beta),$$

$$\text{s.t.} \sum_{i \in I} \alpha_{ki} = 1, \alpha_{ki} \in \{0, 1\}, \text{ for any } k,$$

-continued $$\sum_{j \in J} \beta_{mj} = 1, \beta_{mj} \in \{0, 1\}, \text{ for any } m,$$

where $\gamma$ is a set of parameters of the interest model, I is a set of scene classifications, $\mathcal{W}$ is a set of user classifications, $\mathcal{L}(\mathcal{W}, \alpha, \beta)$ is an experience loss, $\Omega(\mathcal{W}, \alpha, \beta)$ is a penalty loss of $\mathcal{W}$ which is determined according to prior knowledge. If it is assumed that $l(\pi_k(\phi_{ij}), \gamma_m^k)$ indicates a difference between an interest degree diagram which is predicated according to the user interest model $\phi_{ij}$ in the scene $S_k$ and an actual interest degree diagram of the user $U_m$, then the experience loss may be defined as:

$$\mathcal{L}(W, \alpha, \beta) = \sum_{i \in I} \sum_{j \in J} \sum_{m=1}^{M} \sum_{k=1}^{K} \theta_k^m \alpha_{ki} \beta_{mj} l(\pi_k(\phi_{ij}), \gamma_m^k)$$

In an embodiment, $l(\pi_k(\phi_{ij}), \gamma_m^k)$ may be defined as:

$$l(\pi_k(\phi_{ij}), Y_k^m) = \sum_{n_0 \neq n_1}^{N} [y_{kn_0}^m < y_{kn_1}^m]_I \cdot [\overline{w}_{ij}^T x_{kn_1} \leq \overline{w}_{ij}^T x_{kn_0}]_I$$

where $\phi_{ij}(x) = \overline{\omega}_{ij}^T x$ is a linear user interest model, and $\overline{\omega}_{ij}$ its parameter vector. In the foregoing formula, if an event x is true, $[x]_I = 1$; otherwise, $[x]_I = 0$. Meanwhile, the penalty loss $\Omega(\omega, \alpha, \beta)$ is a sum of four penalty items which are set based on prior knowledge. That is:

$$\Omega(\mathcal{W}, \alpha, \beta) = \epsilon_s \Omega_s + \epsilon_u \Omega_u + \epsilon_d \Omega_d + \epsilon_c \Omega_c$$

In the foregoing formula, four weighting coefficients $\epsilon_s$, $\epsilon_u$, $\epsilon_d$, $\epsilon_c$ are set according to an effect on a verification data set. $\Omega_s$ refers to scene classification penalty, which is mainly used to calculate a difference of feature vectors $v_k$ between scenes. When two scenes have the same content but are in different scene classifications, this penalty value is rather great. In an embodiment, the scene classification penalty is defined as:

$$\Omega_s = \sum_{k_0 < k_1}^{K} \sum_{i \in I} (\alpha_{k_0 i} - \alpha_{k_1 i})^2 [\cos(v_{k_0}, v_{k_1})]_+$$

where $\cos(v_{k_0}, v_{k_1})$ indicates a cosine distance between scene feature vectors $v_{k_0}$ and $v_{k_1}$, and $[x]+$ indicates $\max(0, x)$.

$\Omega_u$ refers to user classification penalty, which is mainly used to calculate a difference of features $\overline{v}_k^m$ of objects of interest chosen by users. When users with a same preference are classified into different classifications, the penalty value becomes greater. In an embodiment, the user classification penalty is defined as:

$$\Omega_u = \sum_{m_0 < m_1}^{M} \sum_{j \in J} (\beta_{m_0 j} - \beta_{m_1 j})^2 \delta_{m_0 m_1}$$

where $\delta_{m_0 m_1}$ similarity between users $m_0$ and $m_1$ and is defined as:

$$\delta_{m_0 m_1} = \frac{1}{Z_{m_0 m_1}} \sum_{k_0=1}^{K} \sum_{k_1=1}^{K} \theta_{k_0}^{m_0} \theta_{k_1}^{m_1} \cdot [\cos(v_{k_0}, v_{k_1}) > T_s]_I [\cos(\overline{v}_{k_0}^{m_0}, \overline{v}_{k_1}^{m_1}) > T_s]_I$$

In the foregoing formula, $T_s$ is a predefined threshold value; $Z_{m_0 m_1}$ is a constant which is used to normalize $\delta_{m_0 m_1}$ into a range of [0,1].

$\Omega_d$ refers to model difference penalty, which is mainly used to calculate a predicated loss of different models in different conditions, and different classifications of user models are encouraged to give different predictions. This is because a same classification of user models also has different predictions in different scene classifications. In an embodiment, the user cluster penalty is defined as:

$$\Omega_d = \sum_{i \in I} \sum_{j_0 < j_1}^{|J|} \sum_{k=1}^{K} l(\pi_k(\phi_{ij_0}), -\pi_k(\phi_{ij_1})) + \sum_{j \in J} \sum_{i_0 < i_1}^{|I|} \sum_{k=1}^{K} l(\pi_k(\phi_{i_0 j}), -\pi_k(\phi_{i_1 j}))$$

$\Omega_c$ refers to model complexity penalty which may be obtained by calculating a sum of norms of a model parameter. When an adopted model is complex, this part is relatively great. In an embodiment, the model complexity penalty is defined as:

$$\Omega_c = \sum_{i \in I} \sum_{j \in J} \|\overline{w}_{ij}\|_2^2$$

During a model update process, the penalty item may be used to control the number of classifications of users and scenes, so that generating too complex models can be avoided.

Step 2015: Update scene classification and user classification in sequence on the basis of obtained user interest models.

Step 2016: According to new classification results of scenes and users, train again to obtain a plurality of new user interest models.

Step 2017: Judge whether the predefined number of iteration times is reached, or the objective function is small to a certain value. If yes, execute step 2018; if no, return to step 2015.

Step 2018: Take the user interest models and classifications of scenes and users which are obtained through the last iteration as final user interest models and classifications of scenes and users.

It should be noted that a basis for initially calculating the interest model in step 2014 is to decrease the experience loss as far as possible. In step 2015, the update of classifications of scenes and users is performed on the basis of the obtained user interest models. For example, scene cluster update may be performed according to decreasing errors of model predictions and increasing the content similarity between scenes, and user cluster update may be performed according to a known interest model and increasing the preference similarity between users. Then, new user interest models are calculated again according to newly-obtained classifications of scenes and users. Repeat steps of the iteration and the update until defined conditions are satisfied (the defined number of times is reached, or the value of the objective function is small to a certain extent). After step 2018, the obtained classifications of scenes and users and the user interest models are taken as a basis for subsequent multitask extraction of the object of interest.

Step 202: Extract an object of interest: extract the object of interest in a video according to the user interest models.

Figure 4:
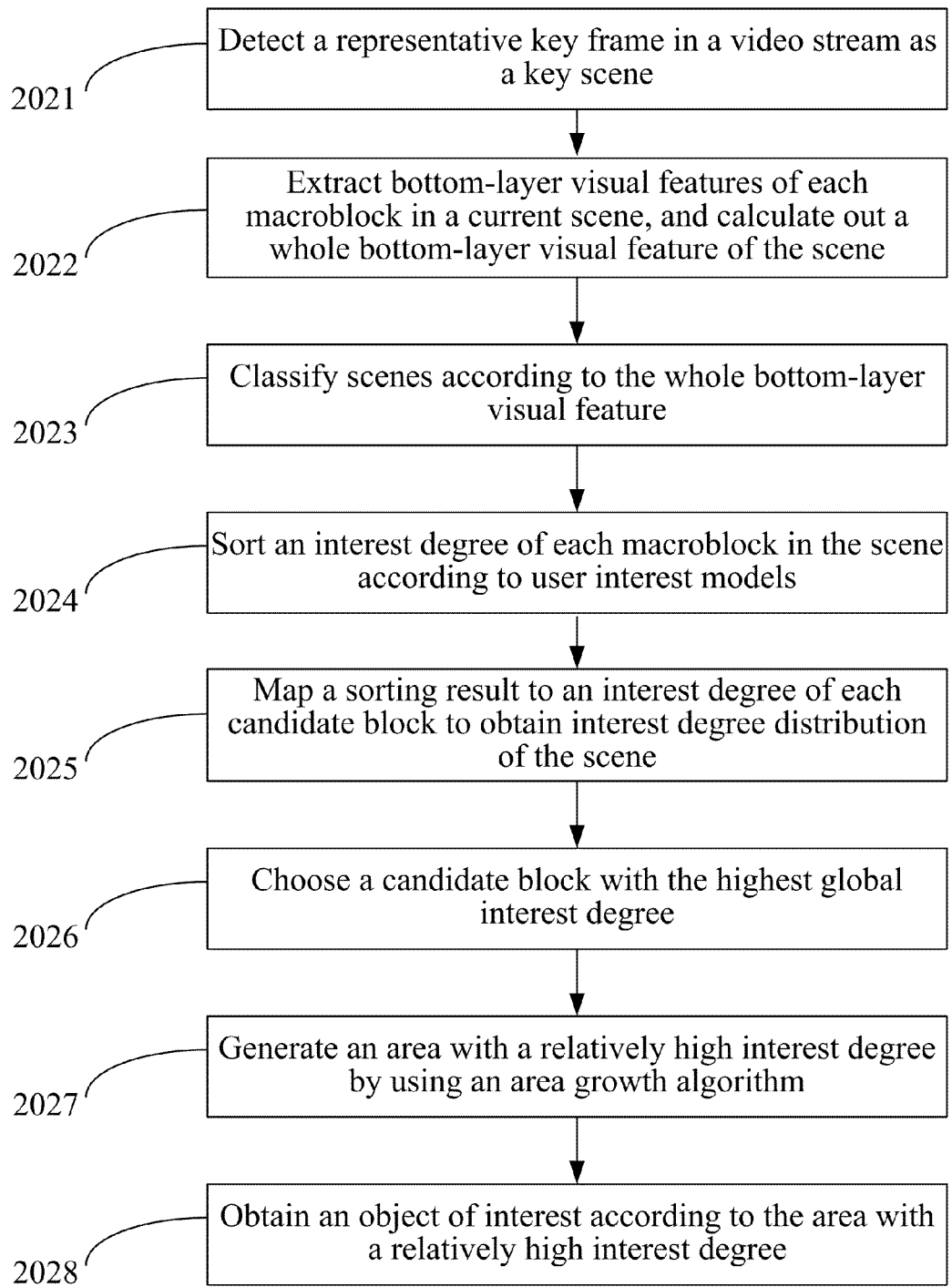
FIG. 4 is a schematic flow chart for extracting an object of interest in a video according to an embodiment of the present invention.

As shown in FIG. 4, the step further includes:

Step 2021: Detect a representative key frame in a video stream as a key scene.

Specifically, similarity among all frames in a video shot is calculated, and a frame which is most similar to another frame is found and taken as the representative key frame.

Step 2022: Extract bottom-layer visual features of each macroblock in a current scene, and calculate out a whole bottom-layer visual feature of the scene.

Specifically, by using the same bottom-layer visual feature as those in the process of the interest model learning, the bottom-layer visual features of each macroblock in the current scene are extracted first, and then the whole bottom-layer visual feature of the scene is calculated. In this embodiment, the expected values and the standard deviation of features of each macroblock are taken as a whole feature of the scene.

Step 2023: Classify scenes according to the whole bottom-layer visual feature.

Specifically, the whole bottom-layer visual feature obtained in step 2022 is taken as a basis for classifying the scene, and the most approximate classification is chosen among known scene classifications. Preferentially, a support vector machine may be trained to perform the classification work. Under the premise that the current user classification and scene classification are known, the interest degree of each macroblock in the scene may be sorted by utilizing the known user interest models.

Step 2024: Sort the interest degree of each macroblock in the scene, according to the user interest models.

Step 2025: Map a sorting result to an interest degree of each candidate block to obtain interest degree distribution of the scene.

Figure 5:
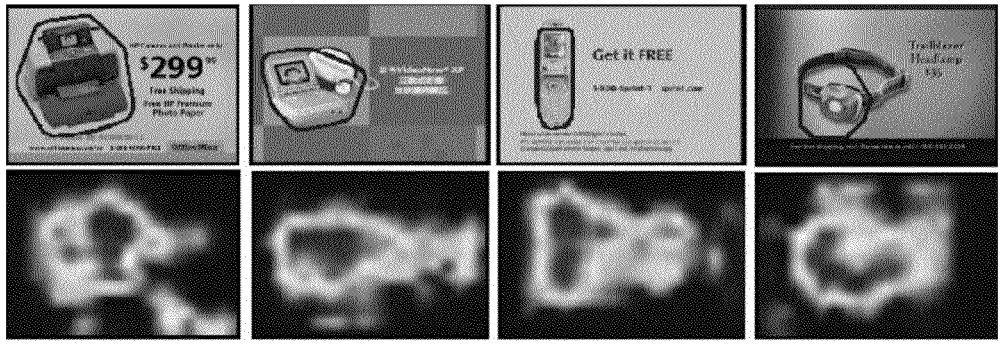
FIG. 5 is a schematic diagram of interest degree distribution of a key frame obtained in a process for extracting an object of interest in a video according to an embodiment of the present invention.

Specifically, perform mapping on the sorting result in step 2024 so as to convert it to a numerical value range that facilitates indication of an interest degree diagram, for example, converting it to a decimal in a range of [0,1]. In an embodiment, sorted serial numbers $C_n \in \{0, \ldots N-1\}$ are mapped, and the mapping work is performed by adopting a quadruplicate function $$\left(\frac{N-Cn-1}{N-1}\right)^4$$

with a value range of [0,1]. According to this, the interest degree diagram of the scene is obtained, as shown in FIG. 5.

Step 2026: Choose a candidate block with the highest global interest degree.

Step 2027: Generate an area with a relatively high interest degree by using an area growth algorithm.

It should be noted that, in this step, the algorithm which is used to generate the area with a relatively high interest degree is not limited to the area growth algorithm, and may also be another algorithm.

Step 2028: Obtain the object of interest according to the area with a relatively high interest degree.

By executing the foregoing steps, an object that the user is interested in is extracted from the video.

Step 203: Retrieve an associated advertisement: extract multiple visual features of the object of interest, and according to these features, retrieve related advertising information in an advertisement database.

In the personalized advertisement push method that is based on user interest learning and is provided in the embodiment of the present invention, the user interest models are obtained by utilizing the multitask sorting learning algorithm, and based on this, areas with a relatively high interest degree in the video are automatically extracted for different users, and then advertising information association is performed by using the areas with a relatively high interest degree. An advertisement provided in such manner is not only closely related to the contents of the video, but also meets the preference of users to a certain extent, thereby realizing the personalized advertisement push.

Figure 6:
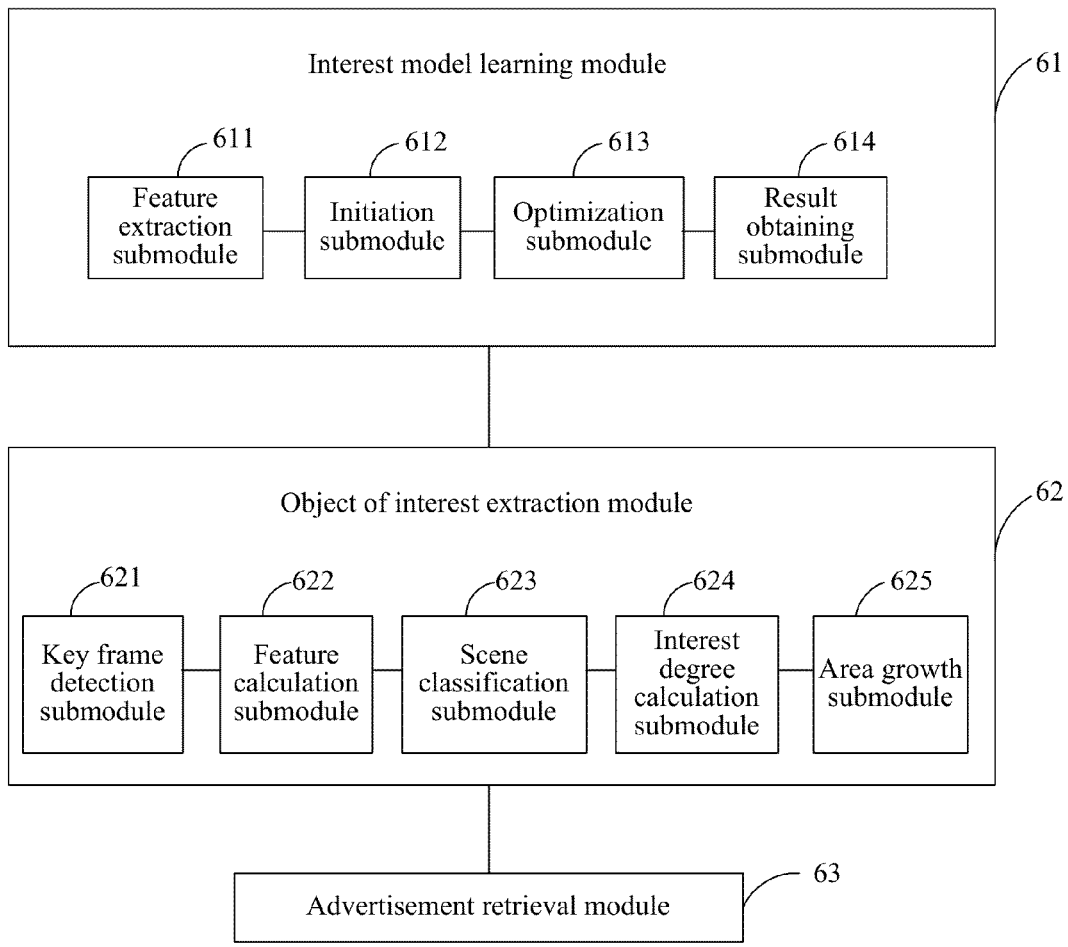
FIG. 6 is a schematic diagram of a personalized advertisement push system based on user interest learning according to an embodiment of the present invention.

As shown in FIG. 6, an embodiment of the present invention further provides a personalized advertisement push system based on user interest learning, where the system includes an interest model learning module 61, an object of interest extraction module 62, and an advertisement retrieval module 63. The interest model learning module 61 is configured to obtain multiple user interest models through multitask sorting learning; the object of interest extraction module 62 is configured to extract an object of interest in a video according to the user interest models; the advertisement retrieval module 63 is configured to extract multiple visual features of the object of interest, and according to the visual features, retrieve related advertising information in an advertisement database.

Further, the interest model learning module 61 may further include the following submodules:

a feature extraction submodule 611, configured to obtain various scenes in training data and extract bottom-layer visual features of each macroblock in each scene;

an initialization submodule 612, configured to, according to the bottom-layer visual features, randomly group users and scenes into multiple classifications, respectively, and initialize an interest model for each classification of users on each classification of scenes;

an optimization submodule 613, configured to use an initialized interest model on a training set to establish a loss function which is taken as an optimization target, minimize the loss function through an optimization algorithm, and then update a parameter value of each interest model and optimize cluster classifications of users and scenes; and a result obtaining submodule 614, configured to obtain final clusters of users and scenes, and multiple user interest models.

Further, the object of interest extraction module 62 may further include the following submodules:

a key frame detection submodule 621, configured to receive an input video stream and detect a representative key frame in a content of the video stream;

a feature calculation submodule 622, configured to, for each key frame, according to bottom-layer visual features of its macroblocks, calculate out a whole visual feature of a scene which corresponds to the key frame;

a scene classification submodule 623, configured to, according to the whole visual feature, classify the scene which corresponds to the key frame into one of scene classifications which are classified in an establishing process of user interest models;

an interest degree calculation submodule 624, configured to, according to the user interest models, calculate an interest degree distribution diagram of the scene where the key frame is located; and an area growth submodule 625, configured to, on the interest degree distribution diagram through an area growth algorithm, obtain an area with the highest interest degree as the object of interest.

Figure 7:
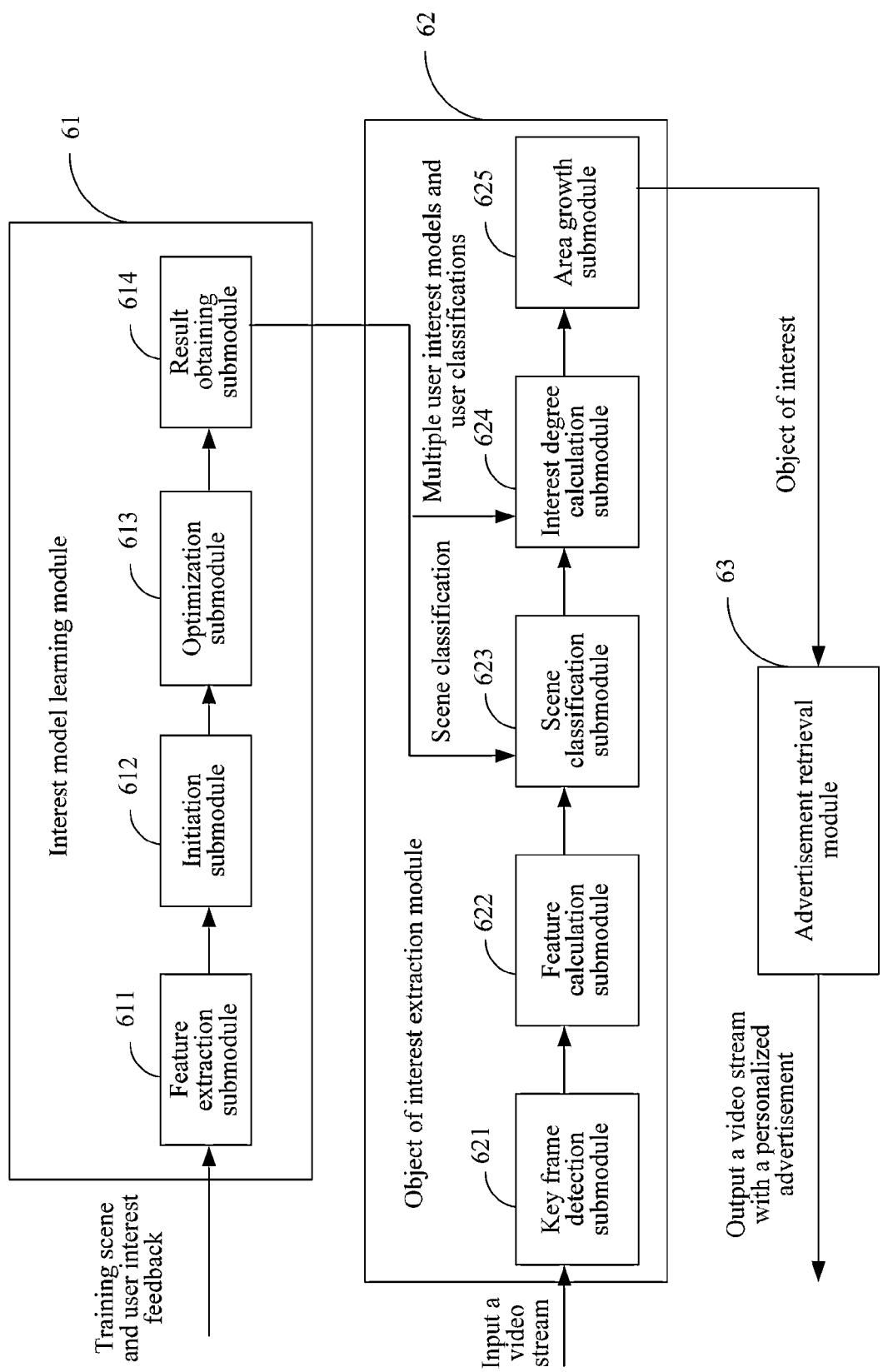
FIG. 7 is a schematic diagram of data flowing based on the system shown in FIG. 6 according to an embodiment of the present invention.

FIG. 7 is a schematic diagram of data flowing among each module in the personalized advertisement push system based on user interest learning according to the embodiment of the present invention, so as to further describe a connection relationship among each module in the personalized advertisement push system based on user interest learning provided in the embodiment of the present invention. As shown in FIG. 7:

In a process of user interest learning, a predefined scene set and a user interest feedback data stream first enter the feature extraction submodule 611, and the feature extraction submodule 611 inputs user interest feedback and a certain type of bottom-layer visual features that are obtained through extraction together into the initialization submodule 612; the initialization submodule 612 classifies users and scenes randomly, and initializes an original user interest model according to a classification result to obtain initial and random classifications of scenes and users, and interest models, and then sends these results to the optimization submodule 613; optimization is performed through an iteration algorithm, so as to update parameters of the interest models and update classifications of users and scenes; after preset conditions are reached, the result obtaining submodule 614 obtains a final user classification result and a final scene classification result and corresponding user interest models from the last iteration result. In a personalized advertisement push process, the key frame detection submodule 621 receives an input video stream, detects a representative key frame in a content, and outputs the key frame to the feature calculation submodule 622 which calculates a whole bottom-layer visual feature of the scene which corresponds to the key frame; a calculated feature data stream accompanying information provided by the result obtaining submodule 614 pass through the scene classification submodule 623 and the interest degree calculation submodule 624 to generate an interest degree distribution diagram of the scene where the key frame is located; and then, the area growth submodule 625 outputs an object of interest to an advertisement retrieval module 63 according to the interest degree distribution diagram, and finally outputs a video stream with a personalized advertisement after extracting multiple visual features and retrieving an advertising information database.

In the personalized advertisement push system based on user interest learning provided in the embodiment of the present invention, user interest models are obtained by utilizing a multitask sorting learning algorithm, and based on this, areas with a relatively high interest degree in the video are automatically extracted for different users, and then advertising information association is performed by using the areas with a relatively high interest degree. An advertisement provided in such manner is not only closely related to the content of the video, but also meets preference of users to a certain extent, thereby realizing the personalized advertisement push.

Figure 8:
FIG. 8 is a schematic diagram of an advertisement push effect generated by a method and a system according to an embodiment of the present invention.

An advertisement push result generated by the method and the system according to the embodiments of the present invention is shown in FIG. 8.

Those of ordinary skill in the art may understand that all or a part of the steps of the method according to the embodiments may be implemented by a program instructing relevant hardware. The program may be stored in a computer readable storage medium. When the program runs, the steps of the foregoing method embodiments are executed. The storage medium may include any medium that is capable of storing program codes, such as a ROM, a RAM, a magnetic disk, or a compact disk.

Finally, it should be noted that the foregoing embodiments are merely used for describing the technical solutions of the present invention, but not intended to limit the present invention. It should be understood by persons of ordinary skill in the art that although the present invention has been described in detail with reference to the foregoing embodiments, modifications can still be made to the technical solutions recorded in each foregoing embodiment, or equivalent replacements can be made to some technical features in the technical solutions, as long as these modifications or replacements do not cause the essence of corresponding technical solutions to depart from the spirit and scope of the technical solutions of each embodiment in the present invention.

What is claimed is:

1. A personalized advertisement push method based on user interest learning, wherein the method comprises:
   obtaining a plurality of user interest models through multitask sorting learning;
   extracting an object of interest in a video according to the user interest models; and
   extracting multiple visual features of the object of interest, and retrieving related advertising information in an advertisement database according to the multiple visual features;
   wherein the obtaining a plurality of user interest models through multitask sorting learning comprises:
   obtaining various scenes in training data, and extracting bottom-layer visual features of each macroblock in each scene; and
   performing classification on users and classification on scenes according to the bottom-layer visual features through an algorithm of multitask sorting learning, and establishing the interest models for each classification of users on each classification of scenes;
   wherein the performing classification on users and classification on scenes according to the bottom-layer visual features through an algorithm of multitask sorting learning, and the establishing the interest models for each classification of users on each classification of scenes comprises:
   randomly grouping the users and the scenes into multiple classifications respectively, and initializing an interest model for each classification of users on each classification of scenes;
   establishing a loss function on a training set as an optimization target by using an initialized interest model;
   minimizing the loss function through an optimization algorithm, and updating a parameter value of each interest model, and optimizing classifications of the users and the scenes; and
   obtaining final classifications of users and scenes, and a plurality of user interest models.

2. The personalized advertisement push method based on user interest learning according to claim 1, wherein the extracting bottom-layer visual features of each macroblock in each scene comprises:
   extracting the bottom-layer visual features of each macroblock in each scene in a multi-scale and multi-vision channel.

3. The personalized advertisement push method based on user interest learning according to claim 2, wherein the bottom-layer visual features comprise a local feature and a global feature.

4. The personalized advertisement push method based on user interest learning according to claim 3, wherein the local feature is obtained by calculating a difference of multiple visual characteristics between the macroblock and its surrounding macroblocks, and the global feature is obtained by calculating a difference of multiple visual characteristics between the macroblock and a whole scene where the macroblock is located.

5. The personalized advertisement push method based on user interest learning according to claim 1, wherein the loss function comprises an experience loss and a penalty loss.

6. The personalized advertisement push method based on user interest learning according to claim 5, wherein the experience loss comprises: a difference between a function value of the bottom-layer visual features of each macroblock in each scene under the interest model and an interest value corresponding to the scene fed back by the users.

7. The personalized advertisement push method based on user interest learning according to claim 5, wherein the penalty loss comprises scene classification penalty, user classification penalty, model difference penalty, and model complexity penalty.

8. The personalized advertisement push method based on user interest learning according to claim 1, wherein the extracting an object of interest in the video according to the user interest models comprises:
  receiving an input video stream, and detecting a representative key frame in content of the video stream;
  for each key frame, according to bottom-layer visual features of its macroblock, calculating a whole visual feature of a scene corresponding to the key frame;
  according to the whole visual feature, classifying the scene corresponding to the key frame into one of scene classifications which are classified in an establishing process of the user interest models;
  according to the obtained user interest models, calculating an interest degree distribution diagram of the scene where the key frame is located; and
  extracting an object with the highest interest degree from the interest degree distribution diagram.

9. The personalized advertisement push method based on user interest learning according to claim 8, wherein the calculating the interest degree distribution diagram of the scene where the key frame is located, according to the obtained user interest models comprises:
  utilizing the obtained user interest models to infer sorting of candidate blocks in the scene where the key frame is located, and mapping the sorting to an interest degree of each candidate block to obtain the interest degree distribution diagram of the scene.

10. The personalized advertisement push method based on user interest learning according to claim 8, wherein the extracting the object with the highest interest degree from the interest degree distribution diagram comprises:
  determining a macroblock with the highest interest degree in the interest degree distribution diagram; and
  obtaining an area with a high interest degree from the macroblock by utilizing an area growth technology, and taking the area as the object of interest.

* * * * *

UNITED STATES PATENT AND TRADEMARK OFFICE
CERTIFICATE OF CORRECTION

| | | |
|---|---|---|
| PATENT NO. | : 8,750,602 B2 | Page 1 of 1 |
| APPLICATION NO. | : 13/709795 | |
| DATED | : June 10, 2014 | |
| INVENTOR(S) | : Li et al. | |

It is certified that error appears in the above-identified patent and that said Letters Patent is hereby corrected as shown below:

On the title page item 73 Assignee, -- Peking University -- should be listed as a second Assignee after -- Huawei Technologies Co., Ltd. --.

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,750,602 B2  
APPLICATION NO. : 13/709795  
DATED : June 10, 2014  
INVENTOR(S) : Li et al.

Page 1 of 1

It is certified that error appears in the above-identified patent and that said Letters Patent is hereby corrected as shown below:

Title Page, item (72) Applicant, line 3, "Guangdong (CN)" should read -- Shenzhen (CN) --.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,750,602 B2
APPLICATION NO. : 13/709795
DATED : June 10, 2014
INVENTOR(S) : Li et al.

It is certified that error appears in the above-identified patent and that said Letters Patent is hereby corrected as shown below:

Title page, Applicant, -- Peking University -- should be listed as a second Applicant after -- Huawei Technologies Co., Ltd. --.

Signed and Sealed this
Twenty-second Day of December, 2015

Michelle K. Lee
*Director of the United States Patent and Trademark Office*

UNITED STATES PATENT AND TRADEMARK OFFICE
CERTIFICATE OF CORRECTION

PATENT NO.        : 8,750,602 B2
APPLICATION NO.   : 13/709795
DATED             : June 10, 2014
INVENTOR(S)       : Li et al.

Page 1 of 1

It is certified that error appears in the above-identified patent and that said Letters Patent is hereby corrected as shown below:

Title page, Item 71 Applicant, -- Peking University -- should be listed as a second Applicant after
-- Huawei Technologies Co., Ltd. --.

This certificate supersedes the Certificate of Correction issued December 22, 2015.

Signed and Sealed this
Twenty-sixth Day of April, 2016

Michelle K. Lee
*Director of the United States Patent and Trademark Office*